United States Patent
Braun et al.

(10) Patent No.: US 9,897,473 B2
(45) Date of Patent: Feb. 20, 2018

(54) MEASURING TRANSDUCER OF VIBRATION-TYPE

(71) Applicant: Endress + Hauser Flowtec AG, Reinach (CH)

(72) Inventors: Marcel Braun, Inzlingen (DE); Robert Lalla, Lorrach (DE); Christian Matt, Reinach (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 33 days.

(21) Appl. No.: 15/107,129

(22) PCT Filed: Nov. 17, 2014

(86) PCT No.: PCT/EP2014/074716
§ 371 (c)(1),
(2) Date: Jun. 22, 2016

(87) PCT Pub. No.: WO2015/096934
PCT Pub. Date: Jul. 2, 2015

(65) Prior Publication Data
US 2017/0003156 A1    Jan. 5, 2017

(30) Foreign Application Priority Data
Dec. 27, 2013  (DE) ........................ 10 2013 021 915

(51) Int. Cl.
*G01F 1/84*       (2006.01)
(52) U.S. Cl.
CPC .......... *G01F 1/8431* (2013.01); *G01F 1/8413* (2013.01); *G01F 1/8477* (2013.01)

(58) Field of Classification Search
CPC ........................................................ G01F 1/84
See application file for complete search history.

(56) References Cited

U.S. PATENT DOCUMENTS 4,879,910 A    11/1989  Lew
5,050,439 A     9/1991  Thompson
(Continued)

FOREIGN PATENT DOCUMENTS

DE    102009001472 A1    9/2010
DE    102009012474 A1    9/2010
(Continued)

OTHER PUBLICATIONS

German Search Report, German Patent Office, Munich, DE, Feb. 25, 2014.
(Continued)

*Primary Examiner* — Jewel V Thompson
(74) *Attorney, Agent, or Firm* — Bacon & Thomas, PLLC

(57) ABSTRACT

The measuring transducer comprises four measuring tubes ($18_1$, $18_2$, $18_3$, $18_4$) as well as two oscillation exciters and (51, 52). The oscillation exciter (51) includes a coil (511) secured to the measuring tube ($18_1$) as well as a permanent magnet (512) secured to the measuring tube ($18_2$) and movable relative to the coil (511) and the oscillation exciter (52) includes a coil (521) secured to the measuring tube ($18_3$) as well as a permanent magnet (522) secured to the measuring tube ($18_4$) and movable relative to the coil (521). In the case of the measuring transducer of the invention, the coils (511, 521) are connected electrically in parallel with one another.

12 Claims, 4 Drawing Sheets

(56) References Cited

U.S. PATENT DOCUMENTS

Figure 1:
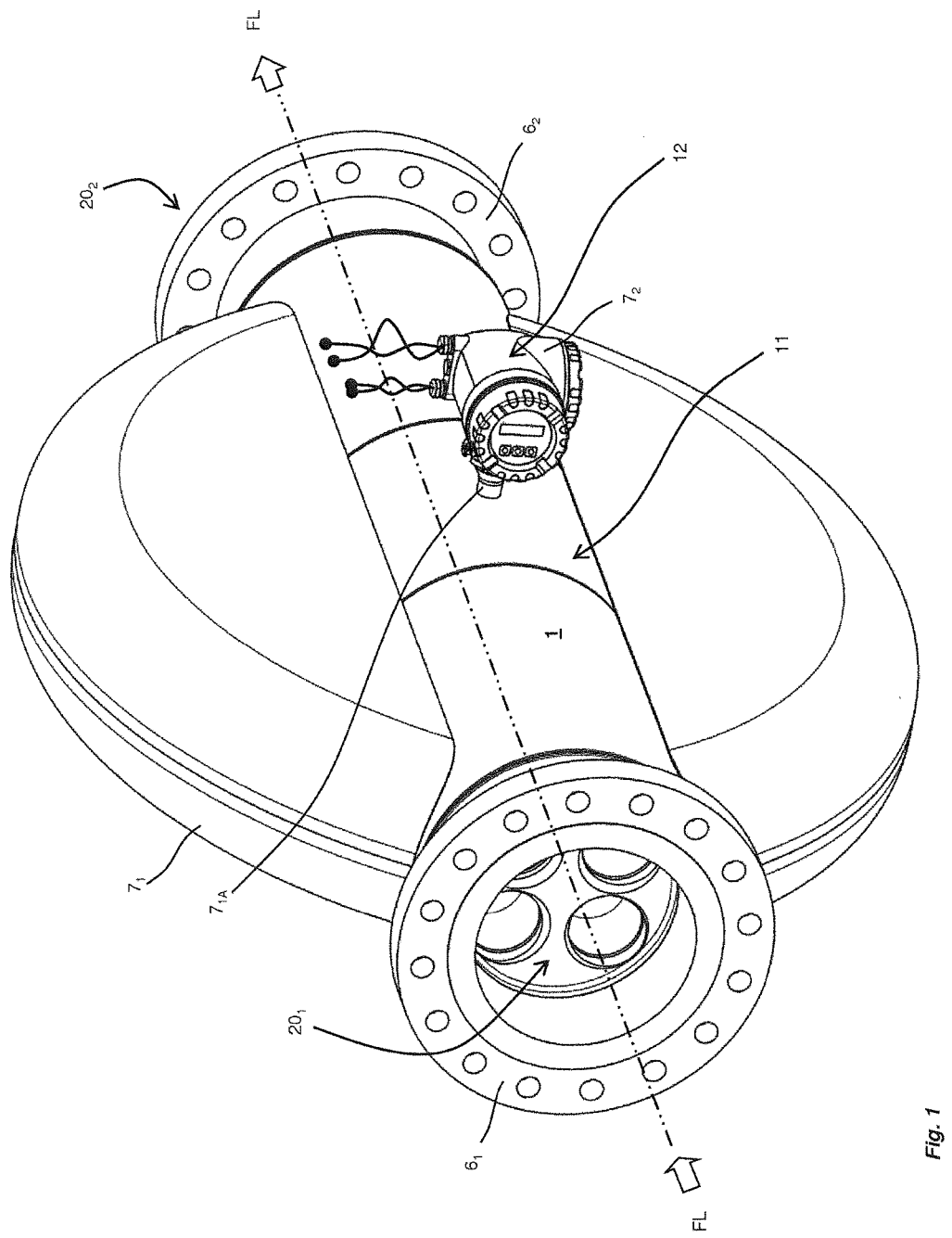

| | | | |
|---|---|---|---|
| 5,230,254 A | 7/1993 | Craft | |
| 5,373,745 A | 12/1994 | Cage | |
| 8,381,600 B2 | 2/2013 | Huber | |
| 8,596,143 B2 * | 12/2013 | Rieder | G01F 1/8495 |
| | | | 73/861.357 |
| 8,695,436 B2 * | 4/2014 | Bitto | G01F 1/84 |
| | | | 73/861.355 |
| 2011/0265580 A1 | 11/2011 | Huber | |

FOREIGN PATENT DOCUMENTS

| | | |
|---|---|---|
| DE | 102013021915 A1 | 7/2015 |
| EP | 1345013 A1 | 9/2003 |
| WO | 2015096934 A1 | 7/2015 |

OTHER PUBLICATIONS

International Search Report, EPO, The Netherlands, Jan. 28, 2015.
English Translation of the International Preliminary Report on Patentability, WIPO, Geneva, CH, Jul. 7, 2016.

* cited by examiner

MEASURING TRANSDUCER OF VIBRATION-TYPE

The invention relates to a measuring transducer of vibration-type. Furthermore, the invention relates to a vibronic measuring device formed by means of such a measuring transducer.

Known from US-A 2012/0073384, respectively US-A 2011/0265580, is, in each case, a vibronic measuring device, for example, one embodied namely as a Coriolis mass flow measuring device, for measuring a measured variable, such as e.g. a mass flow rate, a density and/or a viscosity, of a flowing fluid, for example, a gas, a liquid or a flowable dispersion, containing a measuring transducer of vibration-type for guiding the fluid as well as a measuring- and operating electronics, for example, one formed by means of a microprocessor. A measuring transducer known from the mentioned state of the art comprises a first measuring tube, a second measuring tube arranged extending parallel to the first measuring tube and/or a second measuring tube constructed equally thereto, a third measuring tube constructed equally to the first measuring tube, a fourth measuring tube arranged extending parallel to the third measuring tube and constructed equally thereto, a first oscillation exciter having a first coil secured to the first measuring tube and a cup shaped first permanent magnet secured to the second measuring tube and movable relative to the first coil as well as a second oscillation exciter having a second coil secured to the third measuring tube and constructed equally to the first coil, and having a second permanent magnet secured to the fourth measuring tube, movable relative to the second coil, and constructed equally to the first permanent magnet. The measuring transducer is, especially, provided to be inserted into the course of a pipeline, in such a manner that during operation each lumen of the four measuring tubes is flowed through at least at times by a fluid, for example, namely a gas, a liquid or a flowable dispersion. Each of the four measuring tubes is additionally adapted to be caused to vibrate while being flowed through by fluid, in such a manner that each of the measuring tubes executes mechanical oscillations about a static resting position associated therewith, for example, namely in a so-called V-mode, oscillations which are suitable to induce in the flowing fluid Coriolis forces dependent on a mass flow rate and/or frictional forces dependent on a viscosity of the fluid and/or inertial forces dependent on a density of the fluid. For registering such mechanical oscillations of the measuring tubes and for producing oscillation measurement signals representing oscillatory movements of the measuring tubes, each measuring transducer further includes corresponding oscillation sensors.

The measuring- and operating electronics of the above discussed measuring device further includes electrically connected with the measuring transducer by means of corresponding connecting lines a driver circuit, which, especially, is also adapted to supply, by means of a driver signal provided on a signal output, electrical power to the oscillation exciter via connecting lines, in such a manner that the first coil and the second coil carry electrical current at the same time, and that, by means of the two oscillation exciters changing fed electrical power into mechanical power, driving forces effecting mechanical oscillations of the measuring tubes are introduced at the same time into the measuring tubes. In the case of the measuring transducer known from the above indicated state of the art, the two interconnected coils are connected electrically in series with one another, in such a manner that the coils fed, respectively driven, by means of one and the same signal output of the driver circuit during operation are flowed through by the same electrical current of the driver signal.

A disadvantage of such a series circuit for the two coils of the oscillation exciter is, however, that a possible interruption of the so formed electrical current circuit, for instance, by tearing off of one of the connecting lines or by a defect of one of the coils, necessarily leads to an immediate and total failure of the measuring transducer. A further disadvantage is that the driver circuits, on the one hand, are typically so dimensioned that they can output the driver signal on the previously indicated signal output only at a voltage level limited to a predetermined maximum, so that, on the other hand, in the case of given driver circuit already manufactured in series, the nominally maximum available mechanical power, when required, can be increased quickly, respectively subsequently, only by using correspondingly increased inductance for the oscillation exciter coils. Such increased excitation power can be required, for example, in case the measuring transducer is provided in the exceptional case for measuring a medium with an extremely high viscosity and/or a multiphase medium, for example, a liquid gas mixture, with a concentration ratio fluctuating over a very broad value range. Accompanying the increasing inductances of the two coils, in such case, is also an increase of a total inductance of the electrical current circuits fed by the driver circuit, respectively the inductive reactance of the impedance loading the driver circuit as a whole. As a result of this, increased also is the attenuation of the electrical current driven by the driver circuit and naturally changing with time, in such a manner that the excitation power is changeable with time even more slowly. Another disadvantage is additionally that, not least of all for the case, in which the measuring transducer is provided for use in a region requiring intrinsic safety for electrical operating means, for example, an explosion endangered zone, the total inductance, respectively the total energy storable therein, in the case of the required considerations of malfunction, respectively safety, such as e.g. a short circuit of the respective signal output of the driver circuit, respectively a tearing off of one of the connecting lines, is correspondingly to be estimated, thus all protective measures are to be correspondingly designed for the increased total inductance.

Taking this into consideration, an object of the invention is to provide a coil arrangement with two coils, which convert a mechanical power higher in comparison to the measuring transducers known from the state of the art, respectively which also in the case of comparatively high mechanical power can be applied in a region requiring intrinsic safety for electrical operating means.

For achieving the object, the invention resides in a measuring transducer comprising a first measuring tube, a second measuring tube, for example, a second measuring tube arranged extending parallel to the first measuring tube and/or a second measuring tube constructed equally to the first measuring tube, a third measuring tube, for example, a third measuring tube constructed equally to the first measuring tube, at least a fourth measuring tube, for example, a fourth measuring tube arranged extending parallel to the third measuring tube and/or a fourth measuring tube constructed equally to the third measuring tube, a first oscillation exciter and a second oscillation exciter, for example, a second oscillation exciter constructed equally to the first oscillation exciter. The first oscillation exciter includes a first coil secured to the first measuring tube as well as a first permanent magnet, for example, a cup shaped first permanent magnet, secured to the second measuring tube and movable relative to the first coil, and the second oscillation exciter includes a second coil secured to the third measuring tube, for example, a second coil constructed equally to the first coil, and a second permanent magnet secured to the fourth measuring tube and movable relative to the second coil, for example, a cup shaped second permanent magnet and/or a second permanent magnet constructed equally to the first permanent magnet. In the case of the measuring transducer of the invention, the first coil is connected electrically in parallel with the second coil.

Moreover, the invention resides in a vibronic measuring device, for example, a Coriolis mass flow measuring device, for measuring at least one measured variable, for example, a mass flow rate, a density and/or a viscosity, of a flowing fluid, for example, a gas, a liquid or a flowable dispersion, which measuring device comprises such a measuring transducer for guiding the fluid as well as a measuring- and operating electronics, for example a measuring- and operating electronics formed by means of a microprocessor, wherein the measuring- and operating electronics has a driver circuit electrically connected with the drive system, wherein the driver circuit is adapted to supply electrical power both into the first coil as well as also into the second coil, for example, in such a manner that the first coil and the second coil carry electrical current at the same time and/or that by means of the first coil and by means of the second coil driving forces effecting mechanical oscillations of each of the measuring tubes are introduced into the measuring tubes at the same time.

In a first embodiment of the invention, each of the four measuring tubes has a respective lumen and each of the four measuring tubes is adapted to guide in its lumen a fluid, for example, a fluid flowing at least at times, for example, a fluid in the form of a gas, a liquid or a flowable dispersion.

In a second embodiment of the invention, each of the four measuring tubes is further adapted to be flowed through by a fluid, for example, a gas, a liquid or a flowable dispersion and during that to be caused to vibrate, for example, in such a manner that each of the measuring tubes executes mechanical oscillations about a static resting position associated therewith, oscillations which are suitable to induce in the flowing fluid Coriolis forces dependent on a mass flow rate, and/or that the measuring tube executes mechanical oscillations about a static resting position associated therewith, which oscillations are suitable to induce in the flowing fluid frictional forces dependent on a viscosity, and/or that the measuring tube executes mechanical oscillations about a static resting position associated therewith, which oscillations are suitable to induce in the flowing fluid inertial forces dependent on a density.

In a third embodiment of the invention, the first coil includes a first coil body secured to the first measuring tube as well as a first coil wire wound on the first coil body, for example, a metal first coil wire and/or a first coil wire coated with an electrically insulating lacquer layer, for example, namely a first coil wire of copper or silver or a copper alloy or a silver alloy, and the second coil includes a second coil body secured to the third measuring tube, for example, a second coil body constructed equally to the first coil body, as well as a second coil wire wound on the second coil body, for example, a metal second coil wire and/or a second coil wire coated with an electrically insulating lacquer layer, for example, namely a second coil wire of copper or silver or a copper alloy or a silver alloy.

Developing this embodiment of the invention further, it is, additionally, provided that the measuring transducer further comprises a first connecting line having a first conductor of electrically conductive material, for example, a metal first conductor and/or a first conductor at least partially surrounded by a textile insulation, for example, namely a first conductor of silver or a silver alloy, a second connecting line having a second conductor of electrically conductive material, for example, a metal second conductor and/or a second conductor at least partially surrounded by a textile insulation, for example, namely a second conductor of silver or a silver alloy, a third connecting line having a third conductor of electrically conductive material, for example, a metal third conductor and/or a third conductor at least partially surrounded by a textile insulation, for example, namely a third conductor of silver or a silver alloy, as well as a fourth connecting line having a fourth conductor of electrically conductive material, for example, a metal fourth conductor and/or a fourth conductor at least partially surrounded by a textile insulation, for example, namely a fourth conductor of silver or a silver alloy. Furthermore, it is provided that the first conductor has a first end affixed, for example, by means of material bond, to a first end of the first coil wire for forming an electrically conductive connection, the second conductor has a first end affixed, for example, by means of material bond, to a second end of the first coil wire for forming an electrically conductive connection, the third conductor has a first end affixed, for example, by means of material bond, to a first end of the second coil wire for forming an electrically conductive connection, and the fourth conductor has a first end affixed, for example, by means of material bond, to a second end of the second coil wire for forming an electrically conductive connection. Additionally, a second end of the third conductor can be affixed to the first end of the first coil wire and a second end of the fourth conductor to the second end of the first coil wire, in each case, for forming an electrically conductive connection.

In a first further development of the invention, the measuring transducer further comprises a transducer housing, and it is provided that the measuring tubes and the oscillation exciters are located within the transducer housing. Developing this embodiment of the invention further, a feedthrough formed, for example, by means of a glass and/or a ceramic and/or a synthetic material, for electrical connecting lines is arranged in a wall of the transducer housing.

In a second further development of the invention, the measuring transducer further comprises at least one oscillation sensor, for example, two or more oscillation sensors, for registering mechanical oscillations of the measuring tubes and for producing at least one oscillation measurement signal representing oscillatory movements of the measuring tubes.

A basic idea of the invention is to increase a maximum mechanical power generateable during operation of a measuring transducer of vibration-type formed by means of four measuring tubes using two electrodynamic oscillation exciters, consequently therewith to increase the maximum driving forces introducible into the four measuring tubes for the purpose of active exciting of oscillations of the same, and, indeed, while maintaining an as small as possible inductive reactance of the impedance totally loading the output of the driver circuit feeding the oscillation exciters by interconnecting the wire-connected coils of the two oscillation exciters electrically in parallel.

Figure 2:
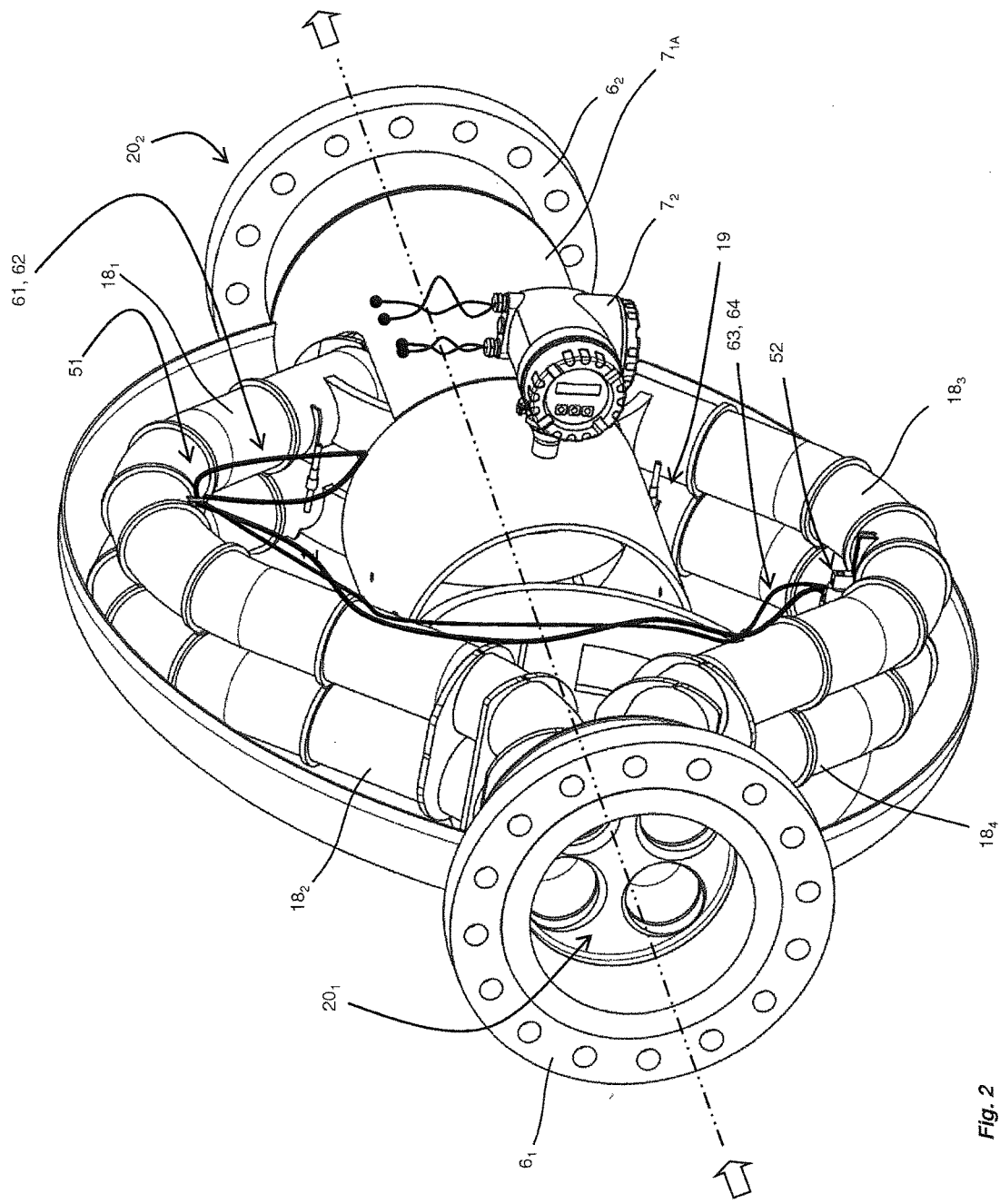
Figure 3:
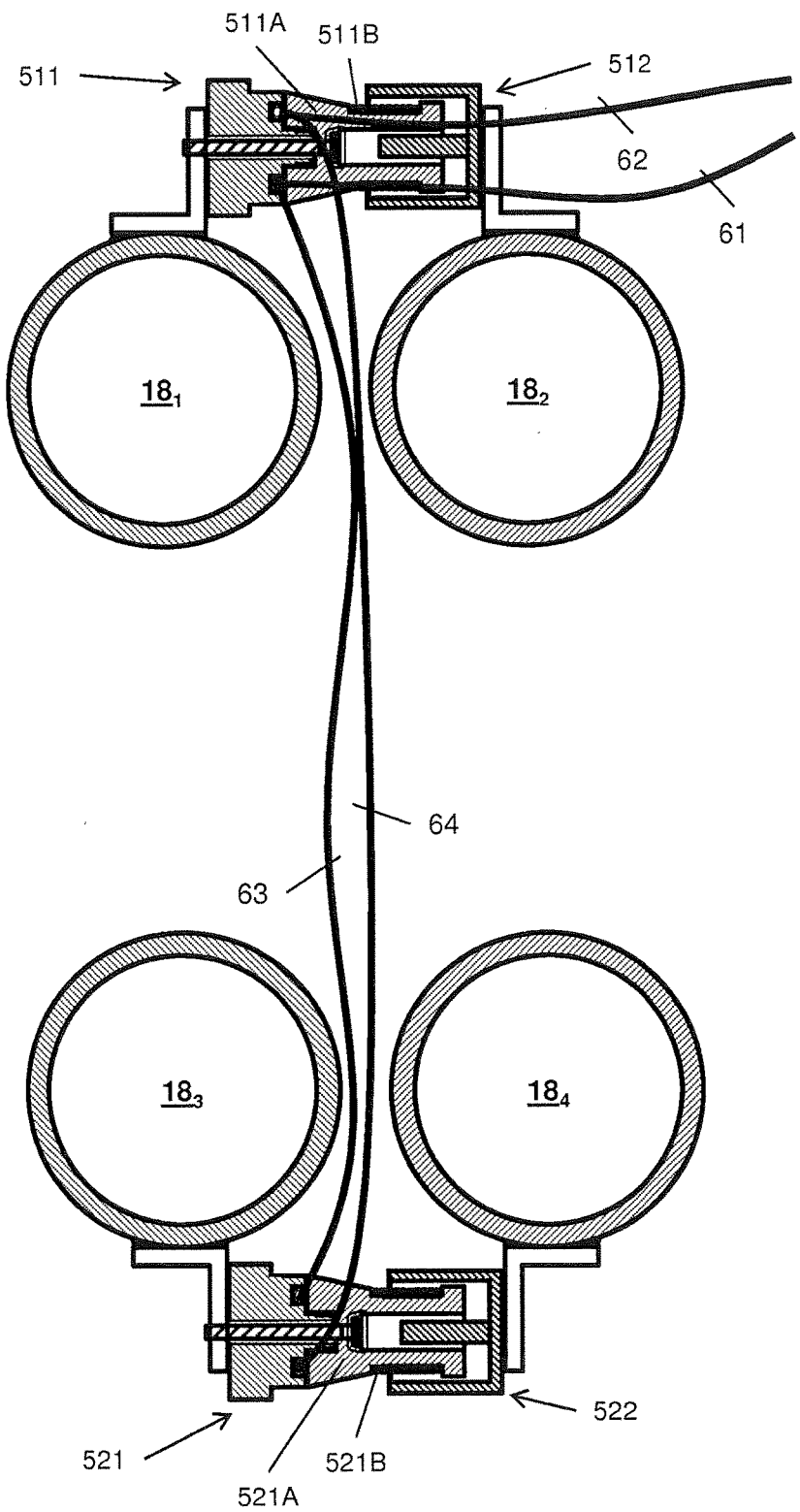
Figure 4:
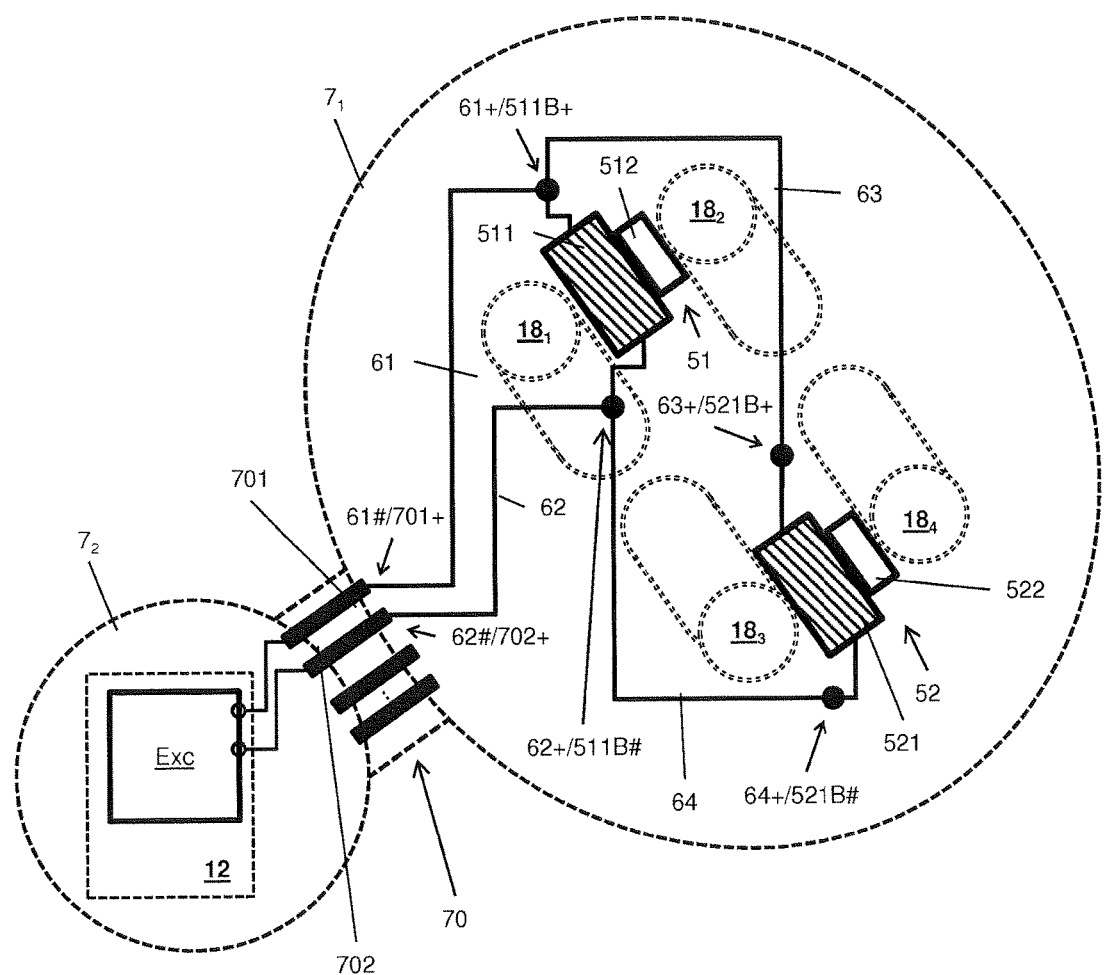

The invention as well as other advantageous embodiments thereof will now be explained in greater detail based on examples of embodiments shown in the figures of the drawing. Equal parts are provided in all figures with equal reference characters; when perspicuity requires or it otherwise appears sensible, already mentioned reference characters are omitted in subsequent figures. Other advantageous embodiments or further developments, for example, also combinations, of first of all, only individually explained aspects of the invention result, furthermore, from the figures of the drawing, as well as also the dependent claims per se. The figures of the drawing show as follows:

FIG. 1 in a perspective side view, a vibronic measuring device;

FIG. 2 in partially sectioned, perspective, side view, a measuring transducer of vibration-type formed by means of four measuring tubes, especially a measuring transducer of vibration-type suitable for a measuring device of FIG. 1;

FIG. 3 in sectioned side view, four measuring tubes as well as two oscillation exciters of a measuring transducer of vibration-type of FIG. 2; and FIG. 4 schematically, a measuring- and drive electronics having a driver circuit and two oscillation exciters electrically connected therewith, especially a measuring- and drive electronics suitable for a measuring device of FIG. 1.

FIG. 1 shows schematically a vibronic measuring device 1, especially a vibronic measuring device embodied as a Coriolis mass flow- and/or density measuring device, which serves, not least of all, to register a mass flow m of a flowing fluid FL, for example, namely a gas, a liquid or a flowable dispersion, and to represent such in a mass flow measured value instantaneously representing mass flow. Alternatively or supplementally, the measuring device 1 can, in given cases, also be used to measure a density $\rho$ and/or a viscosity $\eta$ of the medium. Especially, the measuring device 1 is provided to measure fluids, such as e.g. petroleum, natural gas or other petrochemical substances, which flow in a pipeline (not shown).

Measuring device 1—shown here as an in-line measuring device, namely a measuring device insertable into the course of a pipeline, namely an in-line measuring device of compact construction—comprises: a measuring transducer 11 of vibration-type flowed-through during operation by the medium to be measured; as well as a measuring- and operating electronics 12 (not shown here in detail) electrically connected with the measuring transducer 11 for activating the measuring transducer and for evaluating oscillation signals delivered by the measuring transducer. In advantageous manner, the measuring- and operating electronics 12, formed, for example, by means of one or more microprocessors and/or by means of one or more digital signal processors, can e.g. be so designed that it can during operation of the measuring system 1 exchange measuring—and/or other operating data with a measured value processing unit superordinated to it, for example, a programmable logic controller (PLC), a personal computer and/or a work station, via a data transmission system, for example, a wired fieldbus system and/or wirelessly per radio. Furthermore, the measuring- and operating electronics 12 can be so designed that it can be fed by an external energy supply, for example, also via the aforementioned fieldbus system. For the case, in which the measuring device 1 is provided for coupling to a fieldbus- or other communication system, the measuring- and operating electronics 12, for example, a measuring- and operating electronics 12 also reprogrammable on-site and/or via communication system, can additionally have a corresponding communication interface for data communication, e.g. for sending measured data to the already mentioned programmable logic controller or to a superordinated process control system and/or for receiving settings data for the measuring device. The measuring- and operating electronics 12 can be accommodated, for example, in a separate electronics housing $7_2$, which is arranged removed from the measuring transducer or, such as shown in FIG. 1, the measuring- and operating electronics 12 can be secured directly to the measuring transducer 1 to form a single compact device.

FIGS. 2 and 3 show in different representations a section of a measuring transducer 11 of vibration-type suitable for measuring device 1, especially serving as a Coriolis mass flow-, density- and/or viscosity transducer. Measuring transducer 11 is, for operation, inserted into the course of a pipeline (not shown) flowed-through by the respective medium to be measured, for instance, a powdered, liquid, gaseous or vaporous medium. Measuring transducer 11 serves, such as already mentioned, for producing in a through-flowing medium mechanical reaction forces, especially Coriolis forces dependent on the mass flow rate, inertial forces dependent on the density of the medium and/or frictional forces dependent on the viscosity of the medium, forces which react measurably, especially registerably by sensor, on the measuring transducer. Based on these reaction forces describing the medium, in manner known to those skilled in the art, e.g. the mass flow rate, consequently the mass flow, and/or the density and/or the viscosity of the medium can be measured by means of evaluation methods correspondingly implemented in the measuring- and operating electronics.

Measuring transducer 11 includes a transducer housing $7_1$, here a partially essentially tubular, consequently also outwardly partially circularly cylindrical, transducer housing, in which other components of the measuring transducer 11 serving the registering of the at least one measured variable are accommodated protected against environmental influences, consequently dust or water spray or also forces etc. possibly acting externally on the measuring transducer. An inlet-side, first housing end of the transducer housing $7_1$ is formed by means of an inlet-side, first flow divider $20_1$ and a outlet-side, second housing end of the transducer housing $7_1$ is formed by means of an outlet-side, second flow divider $20_2$. Each of the two flow dividers $20_1$, $20_2$ formed as integral components of the housing includes exactly four, mutually spaced, flow passageways, for example, circularly cylindrical or conical passageways, respectively passageways embodied as inner cones. Moreover, each of the flow dividers $20_1$, $20_2$, for example, flow dividers manufactured of steel, is provided with a flange $6_1$, respectively $6_2$, for example, flanges manufactured of steel, for connecting the measuring transducer 11 to a pipe segment of the pipeline serving for supplying medium to the measuring transducer, respectively to a pipe segment of the pipeline serving for draining medium from the measuring transducer. For leakage free connecting of the measuring transducer with the respectively corresponding pipe segment of the pipeline, each of the flanges includes, furthermore, a corresponding, as planar as possible, sealing surface $6_{1A}$, respectively $6_{2A}$. The flanges $6_1$, $6_2$ can, as well as also directly evident from FIG. 4a and such as quite usual in the case of such measuring transducers, be arranged as close as possible to the flow passageways of the flow dividers $20_1$, $20_2$, in order so to provide an as short as possible in-, respectively outlet region in the flow dividers and, thus, as a whole, to provide an as short as possible installed length of the measuring transducer.

For guiding the fluid FL flowing at least at times through pipeline and measuring transducer, the measuring transducer further comprises in the example of a embodiment shown here a tube arrangement having exactly four bent measuring tubes $18_1$, $18_2$, $18_3$, $18_4$, for example, at least sectionally circular arc shaped and/or—such as shown here schematically—at least sectionally V-shaped measuring tubes, placed within the transducer housing 10 and mounted oscillatably thereto. Each of the measuring tubes $18_1$, $18_2$, $18_3$, $18_4$ has a respective lumen adapted, in each case, to guide the fluid FL. The four measuring tubes—here of equal length and pairwise parallel—communicate, in each case, with the pipeline connected to the measuring transducer and are during operation, at least at times, especially also simultaneously, caused to vibrate in at least one actively excited oscillatory mode—the so-called wanted mode—suitable for ascertaining the physical measured variable. Of the four measuring tubes, a first measuring tube $18_1$ communicates via an inlet-side first measuring tube end with a first flow opening $20_{1A}$ of the first flow divider $20_1$ and via an outlet-side second measuring tube end with a first flow opening $20_{2A}$ of the second flow divider $20_2$, a second measuring tube $18_2$ communicates via an inlet-side first measuring tube end with a second flow opening $20_{1B}$ of the first flow divider $20_1$ and via an outlet-side second measuring tube end with a second flow opening $20_{2B}$ of the second flow divider $20_2$, a third measuring tube $18_3$ communicates via an inlet-side first measuring tube end with a third flow opening $20_{1C}$ of the first flow divider $20_1$ and via an outlet-side second measuring tube end with a third flow opening $20_{2C}$ of the second flow divider $20_2$ and a fourth measuring tube $18_4$ communicates via an inlet-side first measuring tube end with a fourth flow opening $20_{1D}$ of the first flow divider $20_1$ and via an outlet-side second measuring tube end with a fourth flow opening $20_{2D}$ of the second flow divider $20_2$. The four measuring tubes $18_1$, $18_2$, $18_3$, $18_4$ are, thus, connected to the flow dividers $20_1$, $20_2$, especially equally constructed flow dividers $20_1$, $20_2$, to provide paths for parallel flow, and, indeed, in a manner enabling vibrations, especially bending oscillations, of the measuring tubes relative to one another, as well as also relative to the transducer housing. Furthermore, it is provided that the four measuring tubes $18_1$, $18_2$, $18_3$, $18_4$ are held oscillatably in the transducer housing $7_1$—here namely in its middle segment $7_{1A}$—only by means of the mentioned flow dividers $20_1$, $20_2$. Examples of material for the tube walls of the measuring tubes include, for example, stainless steel, in given cases, also high strength, stainless steel, titanium, zirconium or tantalum, respectively alloys formed therewith or also super alloys, such as, for instance, Hastelloy, Inconel, etc. Moreover, serving as material for the four measuring tubes $18_1$, $18_2$, $18_3$, $18_4$ can also be practically any usually applied or at least suitable material, especially such having an as small as possible coefficient of thermal expansion and an as high as possible yield strength.

As already mentioned, in the case of a measuring transducer of vibration-type, the reaction forces in the respective fluid to be measured required for measuring are brought about by simultaneously causing the measuring tubes to oscillate in an actively excited, oscillatory mode, the so-called wanted mode. Goal of the active exciting of the measuring tubes to oscillate, not least of all also for the case, in which the measuring device ultimately formed by means of the measuring transducer should be used for measuring mass flow, is to induce by means of the medium flowing through measuring tubes vibrating in the wanted mode sufficiently strong Coriolis forces, such that, as a result, additional deformations of each of the measuring tubes can be brought about corresponding consequently to an oscillatory mode of the tube arrangement of higher order—the so-called Coriolis mode—with oscillation amplitudes sufficient for measuring. For example, the measuring tubes $18_1$, $18_2$, $18_3$, $18_4$ can be excited to simultaneous bending oscillations at an instantaneous mechanical resonance of the tube arrangement formed by means of the four measuring tubes $18_1$, $18_2$, $18_3$, $18_4$, in the case of which they are—at least predominantly—deflected laterally and caused to oscillate pairwise essentially opposite-equally to one another, for example, in the mentioned V-mode. Accordingly, in an additional embodiment of the invention, each of the four measuring tubes is, especially, also adapted to be flowed through during operation by the fluid FL to be measured and during that to be caused to vibrate; this, especially, also in such a manner that each of the measuring tubes executes mechanical oscillations about a static resting position associated therewith, which oscillations are suitable to induce in the flowing fluid Coriolis forces dependent on the mass flow rate m to be measured and/or to induce in the flowing fluid frictional forces dependent on its viscosity η to be measured and/or to induce in the flowing fluid inertial forces dependent on its density ρ.

For exciting oscillations of the measuring tubes $18_1$, $18_2$, $18_3$, $18_4$, not least of all also oscillations in the wanted mode, the measuring transducer further comprises a first electromechanical, for example, electro-dynamic, oscillation exciter 51 acting on the measuring tubes $18_1$, $18_2$, as well as a second electro-mechanical, oscillation exciter 52 acting on the measuring tubes $18_3$, $18_4$, for example, an oscillation exciter 52 constructed equally to the oscillation exciter 51 and/or an electro-dynamic, oscillation exciter 52. Oscillation exciter 51, includes, such as schematically shown in FIG. 3, respectively 4, a first coil 511 secured to the measuring tube $18_1$ as well as a first permanent magnet 512, for example, a cup shaped permanent magnet, secured to the measuring tube $18_2$ and movable relative to the coil 511, while the oscillation exciter 52 is formed by means of a second coil 521 secured to the measuring tube $18_3$, especially a second coil 521 constructed equally to the coil 511, and by means of a second permanent magnet 522 secured to the measuring tube $18_4$ and movable relative to the coil 521, for example, a cup shaped permanent magnet 522 and/or a permanent magnet 522 constructed equally to the permanent magnet 512. In the example of a embodiment shown here, each of the, for example, equally constructed coils 511, 521 of the oscillation exciter 51, respectively 52, is embodied as a cylindrical coil, wherein, such as shown schematically in FIG. 3, the coil 511 has a first coil body 511A secured to the measuring tube $18_1$ as well as a first coil wire 511B wound on the coil body, for example, a metal coil wire and/or a coil wire coated with an electrically insulating lacquer layer, and wherein the coil 521 has a second coil body 521A secured to the measuring tube $18_3$, for example, a coil body 521A constructed equally to the coil body 511A, as well as a second coil wire 521B wound on the coil body, for example, likewise a metal coil wire, respectively a coil wire coated with an electrically insulating lacquer layer. The coil wires can, in each case, be e.g. of copper or silver, respectively a copper alloy or a silver alloy.

The oscillation exciters 51, 52 positioned within the transducer housing serve, especially, to cause the measuring tubes operationally at least at times to execute oscillations, especially bending oscillations, in the wanted mode for measuring the respective measured variable, with, in each case, oscillation amplitude sufficiently large for producing and registering the above mentioned reaction forces in the medium. The oscillation exciters 51, 52 serve additionally to maintain these wanted oscillations. For such purposes, the oscillation exciters are adapted to convert an electrical excitation power $P_{exc}$ fed by the driver circuit Exc of the measuring—and operating electronics by means of an electrical driver signal simultaneously into the two coils 511, 521 into mechanical power, in such a manner that the oscillation exciters introduce driving forces simultaneously into the measuring tubes to produce mechanical oscillations of the measuring tubes. The driving forces $F_{exc}$— generated by converting electrical excitation power $P_{exc}$ fed into the exciter mechanism into mechanical excitation power—can be controlled in manner known, per se, to those skilled in the art, e.g. by means of an electrical current- and/or voltage controller implemented in the driver circuit as regards their amplitude and, e.g. by means of a phase locked loop (PLL) provided in the measuring- and operating electronics as a regards their frequency; compare, for this, for example, also U.S. Pat. Nos. 4,801,897 or 6,311,136. In an additional embodiment of the invention, it is provided, furthermore, that the measuring- and operating electronics feeds electrical excitation power required for generating the exciter forces into the exciter mechanism by means of an electrical driver signal supplied to the oscillation exciters, for example, via connecting lines, which electrical driver signal is variable with at least one signal frequency having a resonant frequency of a natural mode of oscillation of the tube arrangement, for instance, corresponding to a resonant frequency of the mentioned V-mode.

In the case of the measuring transducer of the invention, as directly evident from the combination of FIGS. 3 and 4, the first coil 511 is electrically connected in parallel with the second coil 521. Moreover, the parallel circuit formed by means of the coils is electrically connected with a signal output of a driver circuit Exc of the measuring- and operating electronics. In an additional embodiment of the invention, the measuring transducer includes for such purpose, as well as also schematically shown in FIGS. 2, 3 and 4, a first connecting line 61 having a first conductor of electrically conductive material, a second connecting line 62 having a second conductor of electrically conductive material, a third connecting line 63 having a third conductor of electrically conductive material, as well as at least a fourth connecting line 64 having a fourth conductor of electrically conductive material, wherein each of the conductors, for example, metal conductors, is affixed, for example, by means of material bonding, in each case, to form an electrically conductive connection to a corresponding end of one of the coil wires 511B, respectively 521B. In the example of an embodiment shown here, the first conductor has a first end 61+ affixed to a first end 511B+ of the coil wire 511B for forming an electrically conductive connection 61+/511B+, the second conductor has a first end 62+ affixed to a second end 511B# of the coil wire 511B for forming an electrically conductive connection 62+/511B#, the third conductor has a first end 63+ affixed to a first end 521B+ of the coil wire 521B for forming an electrically conductive connection 63+/521B+, respectively the fourth conductor has a first end 64+ affixed to a second end 521B# of the coil wire 521B for forming an electrically conductive connection 64+/521B#. The conductors can be electrically insulated, for example, in each case, by means of a tubular plastic jacket or a textile insulation manufactured by means of glass fibers. Used as material for the conductors can be, for example, copper or silver, respectively a copper—or silver alloy.

In the example of an embodiment shown here, the measuring—and operating electronics 12, including the driver circuit for the oscillation exciter, is, such as already mentioned, accommodated within a separate electronics housing $7_2$, that, for example, such as directly evident from a combination of FIGS. 1, 2, and 4, is mounted externally on the transducer housing $7_1$, here namely via a neck like connection nozzle $7_{1A}$ serving to hold the electronics housing $7_2$. For the purpose of electrically connecting the oscillation exciters 51, 52 within the transducer housing $7_1$ with the driver circuit here located outside of the transducer housing $7_1$, according to an additional embodiment of the invention, a feedthrough for electrical connecting lines, for example, a feedthrough formed by means of a glass and/or a ceramic and/or a synthetic material, is arranged in a wall of the transducer housing. The feedthrough, for example, also a hermetically sealed and/or pressure resistant feedthrough, includes a plurality of contact pins, in each case, electrically connected with the measuring- and operating electronics 12, of which a first contact pin 701 and at least a second contact pin 701 are provided for connecting the oscillation exciters 51, 52. In the example of an embodiment shown here, the feedthrough is, such as quite usual in the case of measuring transducers of the type being discussed, arranged within the connection nozzle.

For the purpose of electrically connecting the two oscillation exciters 51, 52 with the driver circuit, the connecting lines 61, 62, 63, 64 can, in each case, individually be brought to the feedthrough and electrically conductively connected, for example, by means of material bond, with one of its contact pins, for example, in such a manner that both the first conductor as well as also the third conductor have respective second ends to form electrically conductive connections with the first contact pin 701 of the feedthrough and that both the second conductor as well as also the fourth conductor have respective second ends to form electrically conductive connections with the second contact pin 702 of the feedthrough. Alternatively thereto, the two oscillation exciter 51, 52 can, however, also be electrically connected with the feedthrough 70, consequently with the driver circuit, by, as well as also directly evident from a combination of FIGS. 2, 3 and 4, on the one hand, affixing the first conductor with its second end 61# to the first contact pin 701 to form an electrically conductive connection 61#/701+ and the second conductor with its second end 62# to the second contact pin 702 to form an electrically conductive connection 62#/702+, and, on the other hand, affixing the third conductor with its second end to the first end 51B+ of the first coil wire 511B, respectively to the first end 61+ of the first conductor, to form an electrically conductive connection and the fourth conductor with its second end to the second end 511B# of the first coil wire 511B, respectively to the first end 62+ of the second conductor, to form an electrically conductive connection.

In an additional embodiment of the invention, the measuring transducer further includes at least one oscillation sensor 19 for registering mechanical oscillations of the measuring tubes and for producing at least one oscillation measurement signal representing oscillatory movements of the measuring tubes. For example, the measuring transducer 11 can, such as quite usual in the case of measuring transducers of the type being discussed, have oscillation sensors registering inlet-side oscillatory movements of the measuring tubes as well as oscillation sensors registering outlet-side oscillatory movements of the measuring tubes. The oscillation sensors can, for example, in each case, be embodied as a kind of solenoid, consequently electrodynamic oscillation sensors, whose respective sensor coils are electrically connected by means of corresponding connecting lines and the feedthrough, in given cases provided in the measuring transducer, to the measuring- and operating electronics 12.

The invention claimed is:

1. Measuring transducer, comprising:
a first measuring tube;
a second measuring tube;
a third measuring tube;
at least a fourth measuring tube;
a first oscillation exciter including a first coil secured to the first measuring tube and a first permanent magnet, secured to the second measuring tube and movable relative to the first coil; and
a second oscillation exciter, including a second coil secured to the third measuring tube, and a second permanent magnet secured to the fourth measuring tube and movable relative to the second coil, wherein the first coil is connected electrically in parallel with the second coil.

2. Measuring transducer as claimed in claim 1, further comprising: a transducer housing, wherein the measuring tubes and the oscillation exciters are located within the transducer housing.

3. Measuring transducer as claimed in claim 1, wherein a feedthrough for electrical connecting lines is arranged in a wall of the transducer housing.

4. Measuring transducer as claimed in claim 1,
wherein the first coil includes a first coil body secured to the first measuring tube and a first coil wire wound on the first coil body, and
wherein the second coil includes a second coil body secured to the third measuring tube.

5. Measuring transducer as claimed in claim 4, further comprising:
a first connecting line including a first conductor of electrically conductive material, wherein the first conductor exhibits a first end affixed to a first end of the first coil wire for forming an electrically conductive connection;
a second connecting line including a second conductor of electrically conductive material, wherein the second conductor exhibits a first end affixed to a second end of the first coil wire for forming an electrically conductive connection;
a third connecting line including a third conductor of electrically conductive material, wherein the third conductor exhibits a first end affixed to a first end of the second coil wire for forming an electrically conductive connection; and
a fourth connecting line including a fourth conductor of electrically conductive material, wherein the fourth conductor exhibits a first end affixed.

6. Measuring transducer as claimed in claim 3,
wherein the first conductor exhibits a second end affixed, to a first contact pin of the feedthrough for forming an electrically conductive connection;
and wherein the second conductor exhibits a second end affixed, to a second contact pin of the feedthrough for forming an electrically conductive connection.

7. Measuring transducer as claimed in claim 6,
wherein the third conductor exhibits a second end affixed, to the first contact pin of the feedthrough for forming an electrically conductive connection;
and wherein the fourth conductor exhibits a second end affixed, to the second contact pin of the feedthrough for forming an electrically conductive connection.

8. Measuring transducer as claimed in claim 5,
wherein the third conductor exhibits a second end affixed to the first end of the first coil wire, respectively to the first end of the first conductor, for forming an electrically conductive connection;
and wherein the fourth conductor exhibits a second end affixed, to the second end of the first coil wire, respectively to the first end of the second conductor, for forming an electrically conductive connection.

9. Measuring transducer as claimed in claim 1, further comprising at least one oscillation sensor for registering mechanical oscillations of the measuring tubes and for producing at least one oscillation measurement signal representing oscillatory movements of the measuring tubes.

10. Measuring transducer as claimed in claim 1, wherein each of the four measuring tubes exhibits a respective lumen and each of the four measuring tubes is adapted to guide in its lumen a fluid.

11. Measuring transducer as claimed in claim 10, wherein each of the four measuring tubes further is adapted to be flowed through by the fluid and during that to be caused to vibrate.

12. Vibronic measuring device, for measuring at least one measured variable, of a flowing fluid, said measuring device comprising:
a measuring transducer as claimed in one of the preceding claims and serving for guiding the fluid; and
a measuring- and operating electronics wherein the measuring and operating electronics includes a driver circuit electrically connected with the drive system, said driver circuit being adapted to supply electrical power both into the first coil as well as also into the second coil.

* * * * *